A. J. A. DEPERDUSSIN.
AEROPLANE.
APPLICATION FILED JUNE 5, 1912.

1,055,990.

Patented Mar. 11, 1913.

3 SHEETS—SHEET 1.

WITNESSES
Sidney Brooks
J. P. Davis

INVENTOR
Armand Jean Auguste Deperdussin
BY Munn & Co
ATTORNEYS

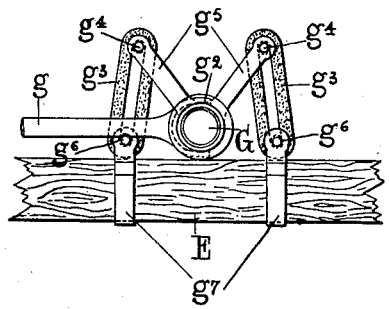
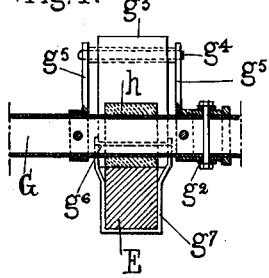
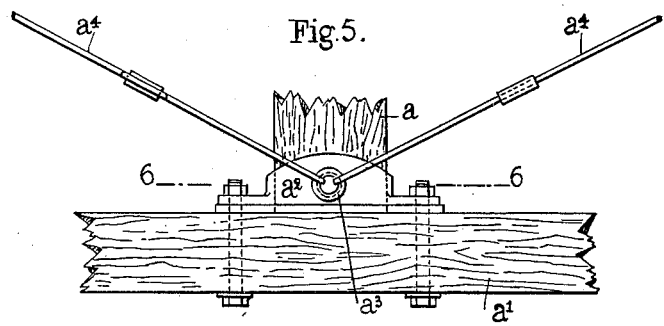
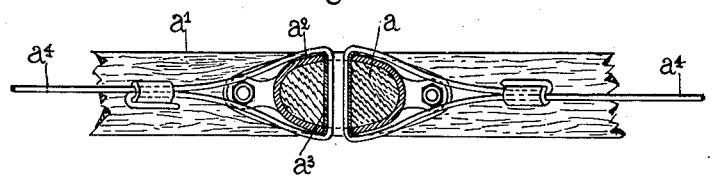

A. J. A. DEPERDUSSIN.
AEROPLANE.
APPLICATION FILED JUNE 5, 1912.

1,055,990.

Patented Mar. 11, 1913.

3 SHEETS—SHEET 3.

WITNESSES
Wm. C. Baker.
J. P. Davis

INVENTOR
ARMAND JEAN AUGUSTE DEPERDUSSIN,
BY Munn & Co
ATTORNEYS

UNITED STATES PATENT OFFICE.

ARMAND JEAN AUGUSTE DEPERDUSSIN, OF PARIS, FRANCE.

AEROPLANE.

1,055,990.  Specification of Letters Patent.  Patented Mar. 11, 1913.

Original application filed January 16, 1911, Serial No. 602,902. Divided and this application filed June 5, 1912. Serial No. 701,784.

*To all whom it may concern:*

Be it known that I, ARMAND JEAN AUGUSTE DEPERDUSSIN, a citizen of the French Republic, and residing at 19 Rue des Entrepreneurs, Paris, France, have invented a new and Improved Aeroplane, of which the following is a full, clear, and exact description.

My invention relates generally to aeroplanes and more particularly consists of improvements relating to the reinforcement and the suspension and support of the frame.

Aeroplanes provided with a car or cage for the accommodation of the aeronaut, together with the engine and the accessories, are well known, the body of the car consisting of a beam of suitable section carrying rings which serve as supports for an envelop or fabric; machines provided with a hull of stream-like form on the under side of the frame are also known.

According to the present invention the frame or fuselage consists of a latticed girder, a portion which is removed to accommodate the motor, together with the passenger seats, the frame being reinforced underneath whereby the girder is strengthened where the lattice work has been removed, the surface thereof being rounded, thereby resembling a hull but not intended in any way to serve as a boat. This "hull" which is below the front portion of the girder also serves as a means for the attachment of the suspension and landing devices; the latter is composed of rigid quadrilaterals made up of uprights secured to the "hull," together with skids having wheels attached thereto by a flexible connection along with protecting crutches which form diagonals.

The invention is hereinafter described with reference to the annexed drawings in which—

Figure 1:
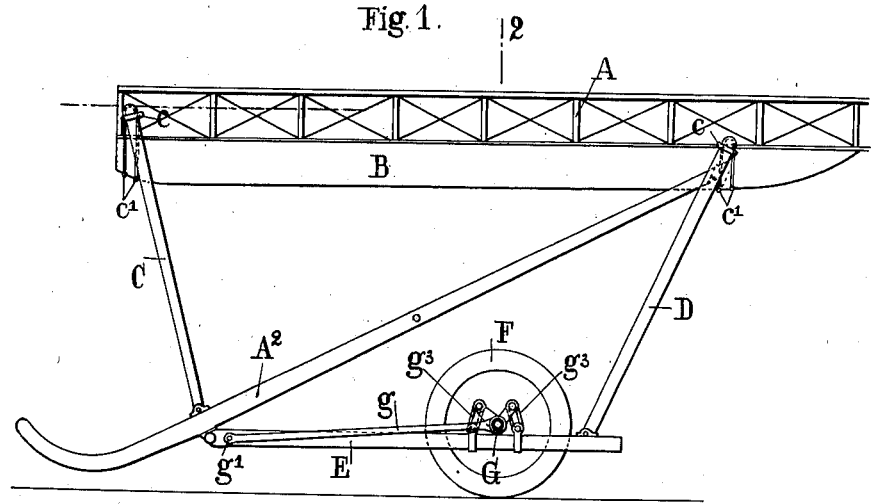
Figure 2:
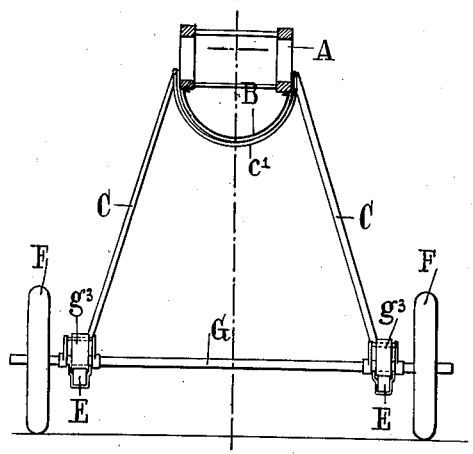
Figure 7:
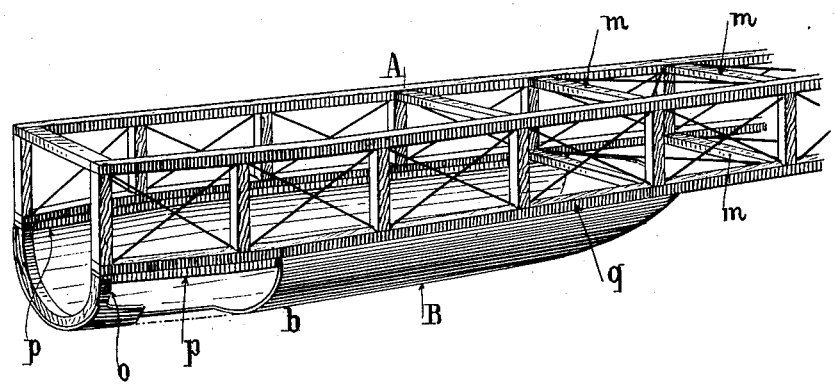
Figure 8:
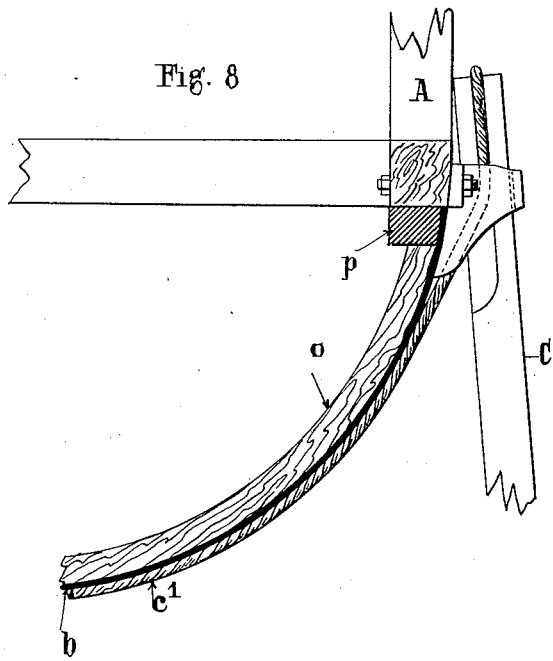

Figure 1 is an elevation of the front part of the apparatus showing the suspension device; Fig. 2 is a section on the line 2—2 of Fig. 1; Figs. 3 and 4 show, in elevation and in section respectively, and on a larger scale, the detail of the flexible suspension of the wheels; Figs. 5 and 6 show in elevation and in plan respectively the details of the arrangement of the longitudinals, uprights and ties of the lattice girder. Fig. 7 is a perspective view of a portion of the lattice frame and the hull secured thereto and a part of the latter broken away, Fig. 8 is a sectional view showing the means for suspending the hull.

The apparatus which is more fully described in my co-pending application Serial No. 602,902 of which this application is a division, consists of a frame or fuselage A, comprising a light lattice girder supporting a tail piece and the rudders at its rear. The transverse or cross bars $m$ of the lattice girder are dispensed with in the front portion of said girder, in order to provide space to accommodate the motor and passengers. A "hull" B, formed of sheets of wood or metal laid upon ribs easily detachable, is located beneath the front of the lattice girder at the removed portion and is intended to reinforce the front of the fuselage and to increase its resistance to shocks transmitted by the front suspension device. This "hull" thereby accommodates the aviators, the engine and the tanks, the controlling means, etc., while maintaining the reduced length and depth of this girder.

The fuselage is mounted upon a suspension device (Figs. 1 and 2) comprising two protecting crutches or runners $A^2$ which form the diagonals of rigid quadrilaterals made up of the frame or fuselage A, the uprights C, D, and the landing skids E. The uprights C, D, are provided at the top with grooves in which are seated the cables or slings $c'$ passing beneath the "hull" and from side to side thereof. The "hull" B is also made fast to the upper parts of the uprights by means of collars $c$ mounted on the uprights C, D, which collars also clamp the cables $c'$ to the uprights and engage bolts passing through the top of the "hull." In this way the parts C, $A^2$, E, D, are firmly secured to and moved with the aeroplane. Two wheels F are mounted loosely upon the axle G which is connected to the apparatus on one hand in the forward direction by two radius rods $g$, at $g'$, upon the skids and embrace the axle by means of forks $g^2$ (Fig. 3) and on the other hand in the vertical direction by means of rubber thongs $g^3$ (Fig. 3) which pass over rods $g^4$ connecting the extremities of the arms of V-shaped clips $g^5$ pinned upon the axle and upon the rods $g^6$ of the collars $g^7$ encircling the skids. The tube which forms the axle is protected by a rubber ring $h$, thereby preventing shocks being communicated from the skids to the axle; the thongs $g^3$ can be withdrawn or placed in position without the necessity of detaching the wheels, such operation being accomplished by merely withdrawing the rods $g^4$, $g^6$. The uprights $a$ of the lattice girder $A'$ are connected to the longitudinals $a'$ by means of sockets $a^2$ bolted upon the longitudinals. Each socket is drilled through together with the corresponding upright $a$ and receives a tube $a^3$, the ends of which are overturned upon the edges of the socket; steel tie rods $a^4$ are passed through the tube, thereby giving rigidity to the fuselage.

Having thus described my invention, I claim as new, and desire to secure by Letters Patent:—

1. An improved monoplane comprising a frame constructed as a lattice girder having transverse bars except near its front end which is thus left free or unobstructed, a hull secured underneath the girder at the point where a free space is provided in the latter, said hull thus constituting a downward extension of the girder adapted to receive aviators and operating devices as described.

2. An improved monoplane comprising a latticed girder, four uprights supporting said girder to which their upper ends are secured, and skids arranged diagonally with relation to the uprights, their front ends projecting and being curved upward, as described.

3. In a monoplane, the combination with a lattice girder, of two pairs of uprights, a hull arranged underneath the girder, and means for supporting the hull, the same consisting of slings passing under the hull and attached to the top of the uprights as described.

In testimony whereof I have signed my name to this specification in the presence of two subscribing witnesses.

ARMAND JEAN AUGUSTE DEPERDUSSIN.

Witnesses:
JACQUES LEJEUNE,
H. C. COXE.